(12) United States Patent
Mauro, II et al.

(10) Patent No.: US 7,804,961 B2
(45) Date of Patent: Sep. 28, 2010

(54) METHOD AND APPARATUS FOR FAST CRYTOGRAPHIC KEY GENERATION

(75) Inventors: Anthony Patrick Mauro, II, San Diego, CA (US); Magdalena Espelien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 961 days.

(21) Appl. No.: 10/029,639

(22) Filed: Dec. 19, 2001

(65) Prior Publication Data

US 2002/0114470 A1    Aug. 22, 2002

Related U.S. Application Data

(60) Provisional application No. 60/257,200, filed on Dec. 19, 2000.

(51) Int. Cl.
*H04K 1/00* (2006.01)
*H04L 9/00* (2006.01)
(52) U.S. Cl. .................... 380/270; 380/44; 380/277
(58) Field of Classification Search .............. None
See application file for complete search history.

(56) References Cited

U.S. PATENT DOCUMENTS

| | | | | |
|---|---|---|---|---|
| 5,319,711 A | * | 6/1994 | Servi | 380/247 |
| 5,325,434 A | * | 6/1994 | Spaanderman et al. | 380/45 |
| 6,839,434 B1 | * | 1/2005 | Mizikovsky | 380/247 |
| 6,955,299 B1 | * | 10/2005 | Pathmasuntharan et al. | 235/492 |
| 7,237,261 B1 | * | 6/2007 | Huber et al. | 726/12 |

OTHER PUBLICATIONS

Kwon et al., Integrated Transport Layer Security:End to End Security Model between WTLS and TLS, Feb. 2, 2001.*
Dierks et al., The TLS Protocol, Version 1.0, http://www.ietf.org/rfc/rfc2246.txt, Jan. 1999.*

* cited by examiner

*Primary Examiner*—Benjamin E Lanier
(74) *Attorney, Agent, or Firm*—Won Tae C Kim

(57) ABSTRACT

A method and apparatus for fast generation of a cryptographic key. A processor within a wireless communication device generates a public key upon termination of wireless communication. When a user of the wireless communication device desires to initiate a secure communication subsequent to the previous communication, the public key that was generated upon termination of the previous communication is used to engage in secure communications with a second communication device.

15 Claims, 2 Drawing Sheets

METHOD AND APPARATUS FOR FAST CRYTOGRAPHIC KEY GENERATION

CROSS-REFERENCE TO RELATED APPLICATION

This application claims the benefit of U.S. Provisional Patent Application Serial No. 60/257,200, filed Dec. 19, 2000, which is incorporated herein by reference in its entirety.

STATEMENT REGARDING FEDERALLY SPONSORED RESEARCH OR DEVELOPMENT

The described embodiments were made with government support under United States government contract MDA904-96-G-0035 awarded by the National Security Agency (NSA), Maryland Procurement Office. The government may have certain rights in these described embodiments.

BACKGROUND

I. Field of the Invention

The present invention pertains generally to the field of cryptography, and more specifically to a method and apparatus for fast cryptographic key generation in a communication device.

II. Description of the Related Art

Wireless communications have become commonplace in much of the world today. In many digital wireless communication systems, audio information, typically voice, is transmitted between wireless communication devices and other end units via infrastructure equipment. In modern communication systems, data transmission is also possible. Such uses of wireless data transmission include Internet access, transmitting email, or transmitting voice using data protocols. Examples of digital wireless communication systems include code division multiple access (CDMA) systems, global system for mobile communications (GSM) systems, wideband code division multiple access (WCDMA) systems, as well as others.

It is often desired to provide for security and authentication in such wireless communication systems, and such security and authentication currently exist in modern communication systems today. Often, public-key cryptography is used in these systems to provide secure communications. Public-key cryptography is well known in the art, and relies on the generation of a pair of cryptographic keys, a private key and a public key. The public key may be shared with other entities, but the private key remains secret to others. Information is encrypted using another's public key. The encrypted information is then transmitted to a remote device that supplied the public key. The remote device decrypts the information using a private key corresponding to the remote device's public key. Only the remote device knows this private key.

In virtually all public key systems, the encryption and decryption times are very lengthy compared to other block-oriented algorithms such as DES for equivalent data sizes. Therefore, in most implementations of public-key systems, a temporary, random 'session key' of much smaller length than the message is generated for each message and alone encrypted by the public key algorithm. The message is actually encrypted using a faster private key algorithm with the session key. At the receiver side, the session key is decrypted using the public-key algorithms and the recovered 'plaintext' key is used to decrypt the message.

One problem with using public key cryptography and variations thereof in mobile applications, such as in a wireless communication device, is that generation of the public key can take significant processing power and time to compute. Generally, a public key and a private key is generated after a user of the communication device initiates a communication. The communication device must then compute the public and private key, resulting in a delay in establishing a secure communication with a remote device. Therefore, what is needed is a way to generate the public key and/or private key quickly after a user indicates a desire to initiate a secure communication.

SUMMARY

The present invention is directed to a method and apparatus for fast cryptographic key generation. In one embodiment, a wireless communication device comprises an apparatus for fast cryptographic key generation, comprising a memory for storing a cryptographic key and a processor for generating a public key and a private key, said public key generated upon termination of a wireless communication and stored in said memory, wherein said public key is used for encrypting a subsequent communication by said wireless communication device.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
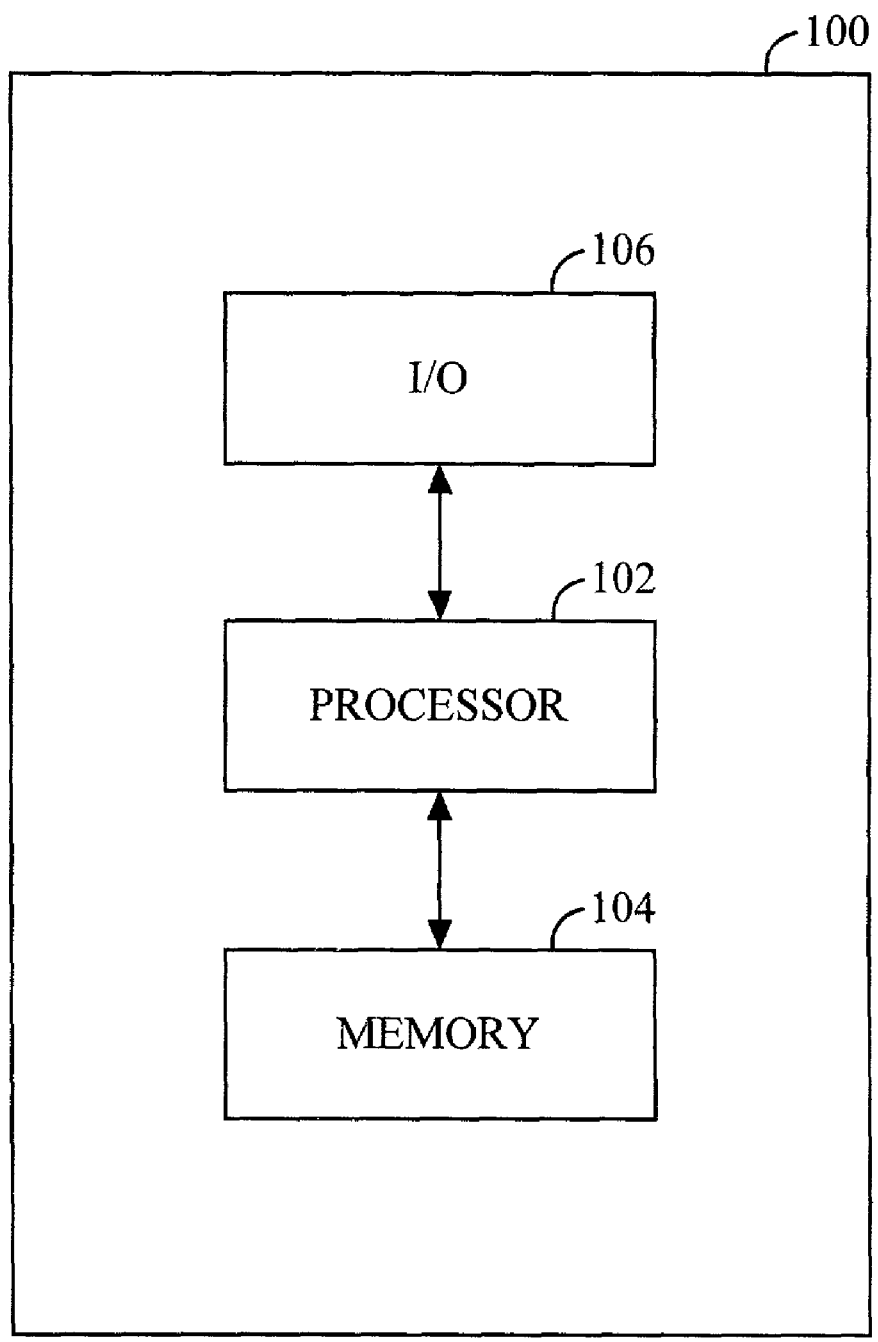
FIG. 1 illustrates an electronic device for providing fast generation of a cryptographic key.

FIG. 1 illustrates an electronic device 100 for providing fast generation of a cryptographic key. Electronic device 100 comprises one of a variety of electronic devices commonly used in the world today, such as a wireless or wireline telephone, a wireless or wireline modem, a data terminal, a pager, a Personal Digital Assistant (PDA) etc. Each of these devices may have a need to transmit or receive "secure" information, or information that has been encrypted using one of a variety of encryption techniques. Although electronic device 100 is discussed herein as comprising a wireless communication device (such as a cellular telephone), it should be understood that the teachings of the method and apparatus for fast generation of a cryptographic key could be applied to any of the electronic devices mentioned above, without limitation.

Electronic device 100 comprises a processor 102, a memory 104, and an input/output device 106. Other functional elements have been omitted from FIG. 1 for clarity.

Processor 102 comprises a digital processor for running executable computer instructions. For example, processor 102 comprises generally any one of a number of microprocessors known in the art, such as any of the 80x86 processors manufactured by Intel Corporation. Alternatively, processor 102 comprises an ARM 7 or an ARM 9, manufactured by Advanced RISC Machines, LTD. Processor 102 generally controls the overall functionality of electronic device 100, including the task of encrypting and decrypting information.

Processor 102 may comprise more than one processor, in other embodiments. For example, a digital signal processor (DSP) may be used to perform specialized tasks, such as the generation of keys, and the encryption and decryption of information. Such DSPs are well-known in the art, and include devices such as the TMS320C2000, TMS320C5000, and TMS320C6000 series of chips manufactured by Texas Instruments; the DSP56300, DSP56800, and MSC8100 (StarCore) series manufactured by Motorola; the DSP16000 series manufactured by Agere Systems (formerly Lucent Technologies); and the ADSP-2100 and ADSP-21000 ("SHARC") series, manufactured by Analog Devices.

Memory 104 comprises one or more electronic digital memories, generally for storing executable computer instructions and related data. Memory 104 may comprise a random access memory (RAM), a read-only memory (ROM), flash memory, electrically-erasable programmable read-only memory (EEPROM), ultra-violet programmable read-only memory (UVPROM), or any other electronic memory known in the art. Memory 104 could alternatively comprise an electromechanical storage device such as a hard drive, a tape drive, a CD rom, or others.

Memory 104 stores cryptographic "keys" that comprise a sequence of random digits, or bits, and are used with one or more cipher algorithms to encrypt and decrypt information that is transmitted or received by electronic device 100. In one embodiment, a number of different keys are stored within memory 104.

The "strength", of any cipher algorithm depends largely on the length, or number of digits, of the encryption key that is used to encrypt information. A key length of 56 bits is considered to be a "weak" key while a key length of 128 bits is considered to be a "strong" key.

Processor 102 shown in FIG. 1 is responsible for generating one or more encryption keys when a secure mode of communication is entered into. Generally, a user of electronic device 100 will request a secure communication with a second communication device by depressing one or more keys on a keypad of input/output device 106. Input/output device 106 comprises one of any number of well known I/O devices in the art, and may include a keyboard, keypad, a display, etc.

When a secure communication is desired by a user of electronic device 100, processor 102 generates one or more keys needed to support the communication. For example, in one embodiment, a Diffie-Hellman key exchange method is used. The Diffie-Hellman key exchange method is well known in the art. As part of that procedure, a public key and a private key is generated by electronic device 100. The public key is then transmitted to a desired communication device upon an initial communication with the desired communication device. Electronic device 100 also receives a public key generated by the desired communication device during this time. Each communication device then calculates a shared key based on the others' public key and a private key that is only known to each respective communication device. For example, electronic device 100 uses the received public key from the desired communication device and the private key that was just generated to calculate a shared key. The desired communication device also calculates a shared key, based on the public key transmitted by electronic device 100 and a private key generated by the desired communication device. After the shared key is generated, a synchronization between communication devices may take place, depending on which kind of encryption scheme is used. For example, in one embodiment, each communication device calculates a cryptosync packet, which is transmitted to the other communication device. This synchronizes each communication device for subsequent transmission of encrypted data packets. Finally, secure communications take place by encrypting information using the shared key. Any one of a number of encryption ciphers may be used to encrypt or decrypt information using the shared key.

When the communication terminates, by either a unilateral or mutual decision to end the communication, processor 102 takes the necessary steps to terminate the communication, as is normally done in a wireless communication device. However, processor 102 also calculates a new public key upon termination of the communication. This new public key is then stored in memory 104 until the user of electronic device 100 desires to initiate a second secure communication. When this occurs, processor 102 does not need to calculate a public key. It simply accesses memory 104 and uses the new public key that was calculated upon termination of the previous communication for transmission to the desired communication device. Thus, a relatively significant amount of time and processing power is saved, thereby allowing the communication to be set up quickly.

Figure 2:
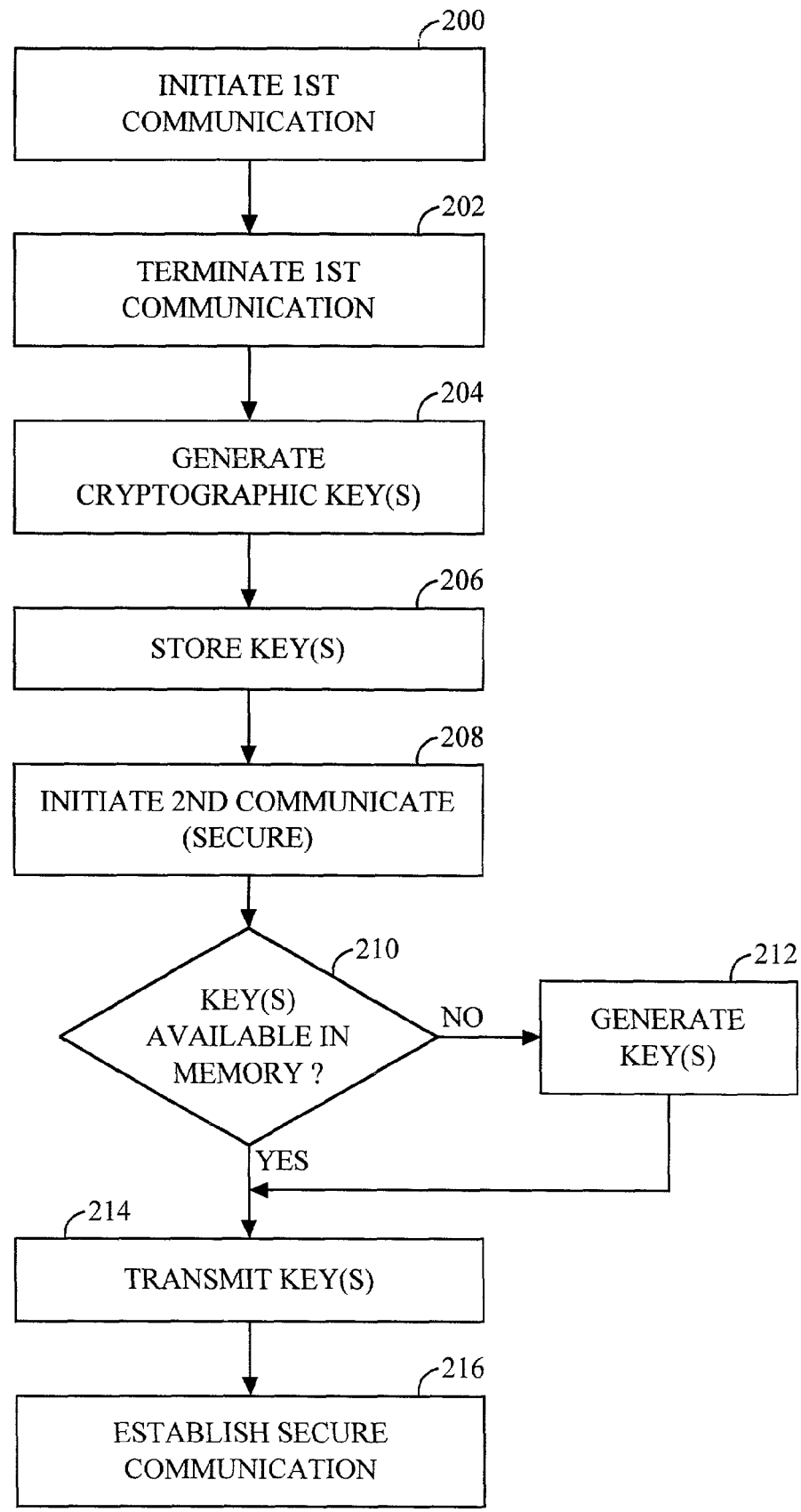
FIG. 2 is a flow diagram illustrating one embodiment of a method for fast generation of an encryption key.

FIG. 2 is a flow diagram illustrating one embodiment of a method for fast generation of an encryption key. In step 200, a first communication is entered into. The first communication may have been initiated by electronic device 100 or it may have been initiated by a communication device other than electronic device 100. The first communication may be a secure communication or it may be a "clear" communication, i.e., a "typical" voice or data communication in which no encryption is used. In any case, at some point, the first communication is terminated, as shown in step 202.

In step 204, as a result of termination of the first communication, processor 102 generates one or more cryptographic keys. In one embodiment, a public key is generated. In another embodiment, both a public and a private key are generated, the private key typically being stored in a secure memory (not shown) within electronic device 100.

In step 206 the key(s) are stored in one or more memories 104 within electronic device 100.

At some time subsequent to step 206, a user of electronic device initiates a secure communication with a desired communication device, shown as step 208. Rather than generate a new cryptographic key(s) at that time, processor 102 determines whether or not key(s) were stored in memory 104 upon termination of a previous communication, as shown in step 210. If no key(s) have been previously stored in memory 104 from a previous communication, processor 104 calculates the necessary key(s), as shown in step 212, then proceeds to step 214. If, in step 210, the key(s) necessary to support a secure communication are stored in memory 104, processing continues to step 214, where the key(s) are retrieved from memory 104 and transmitted to the desired communication device. Electronic device 100 may also receive information necessary to support a secure communication from the desired communication device at this time. Finally, in step 216, a secure communication is established with the desired communication device.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments discussed herein, but is to be accorded the widest scope consistent with the principles and novel features disclosed herein.

We claim:

1. A method for generation of a cryptographic key by a wireless communication device, comprising:

generating a first public key for encrypting a first wireless communication;

generating, after termination of the first wireless communication and prior to initiation of a second secure wireless communication of the wireless communication device with a desired communication device, a second public key for transmission to the desired communication device, wherein the second public key is independent of the first public key;

storing the second public key in a memory of the wireless communication device prior to initiation of the second secure wireless communication with the desired communication device;

initiating, in response to a user input, the second secure wireless communication of the wireless communication device with the desired communication device; and transmitting the second public key to the desired communication device if the second public key is available in the memory.

2. A wireless communication device for generation of a cryptographic key, comprising:

means for generating a first public key for encrypting a first wireless communication;

means for generating, after termination of the first wireless communication and prior to initiation of a second secure wireless communication with a desired communication device, a second public key for transmission to the desired communication device, wherein the second public key is independent of the first public key;

means for storing the second public key in memory prior to initiation of the second secure wireless communication with the desired communication device;

means for initiating, in response to a user input, the second secure wireless communication with the desired communication device; and means for transmitting the second public key to the desired communication device if the second public key is available in the memory.

3. A wireless communication device for generation of a cryptographic key, comprising:

a processor for:

generating a first public key to encrypt a first wireless communication;

generating, after termination of the first wireless communication and prior to initiation of a second secure wireless communication with a desired communication device, a second public key for transmission to the desired communication device;

storing the second public key in memory prior to initiation of the second secure wireless communication with the desired communication device initiating, in response to a user input, the second secure wireless communication with the desired communication device; and transmitting the second public key to the desired communication device if the second public key is available in the memory;

the memory for storing the second public key, wherein the second public key is independent of the first public key.

4. A processor for generation of a cryptographic key, said processor being configured to:

generate a first public key for encrypting a first wireless communication;

generate, after termination of the first wireless communication and prior to initiation of a second secure wireless communication with a desired communication device, a second public key for transmission to the desired communication device, wherein the second public key is independent of the first public key;

store the second public key in memory prior to initiation of the second secure wireless communication with the desired communication device;

initiate, in response to a user input, the second secure wireless communication with the desired communication device; and transmit the second public key to the desired communication device if the second public key is available in the memory.

5. A memory comprising instructions for generation of a cryptographic key, wherein the instructions upon execution cause a computer to:

generate a first public key for encrypting a first wireless communication;

generate, after termination of the first wireless communication and prior to initiation of a second secure wireless communication with a desired communication device, a second public key for transmission to the desired communication device, wherein the second public key is independent of the first public key;

store the second public key in memory prior to initiation of the second secure wireless communication with the desired communication device;

initiate, in response to a user input, the second secure wireless communication with the desired communication device; and transmit the second public key to the desired communication device if the second public key is available in the memory.

6. The memory of claim 5, wherein the instructions upon execution further cause a computer to:

determine whether the second public key has been stored prior to establishing the second wireless communication.

7. The memory of claim 6, wherein the instructions upon execution further cause a computer to:

generate a third public key to transmit to the desired communication device when it is determined that the second public key has not been stored.

8. The processor of claim 4, wherein said processor is further configured to:

determine whether the second public key has been stored prior to establishing the second wireless communication.

9. The processor of claim 8, wherein said processor is further configured to:

generate a third public key to transmit to the desired communication device when it is determined that the second public key has not been stored.

10. The wireless communication device of claim 3, wherein the processor determines whether the second public key has been stored prior to establishing the second wireless communication.

11. The wireless communication device of claim 10, wherein the processor generates a third public key to transmit to the desired communication device when it is determined that the second public key has not been stored.

12. The method of claim 1, further comprising:

determining whether the second public key has been stored prior to establishing the second wireless communication.

13. The wireless communication device of claim 2, further comprising:

means for determining whether the second public key has been stored prior to establishing the second wireless communication.

14. The method of claim 12, further comprising:

generating a third public key to transmit to the desired communication device when it is determined that the second public key has not been stored.

15. The wireless communication device of claim 13, further comprising:

means for generating a third public key to transmit to the desired communication device when it is determined that the second public key has not been stored.

* * * * *